HENRY WALMER.
Improvement in Wagon-Brakes.
No. 114,995.
Patented May 16, 1871.
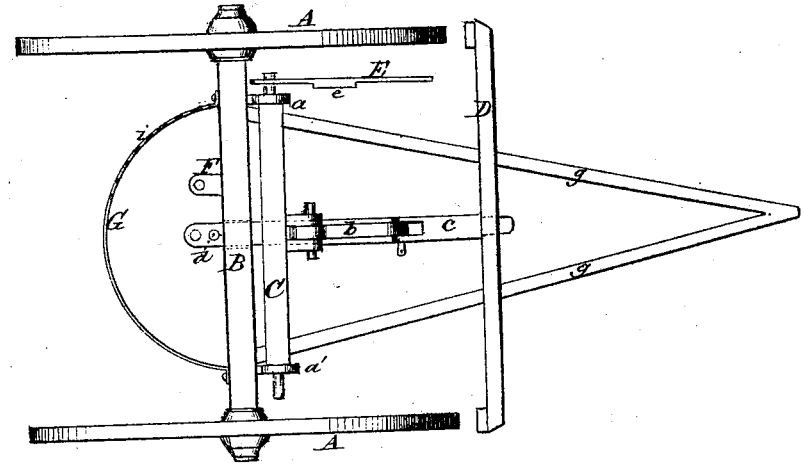
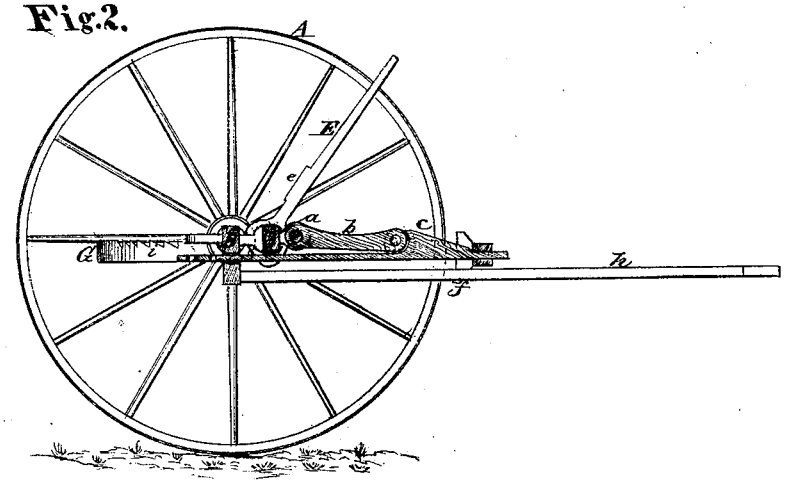
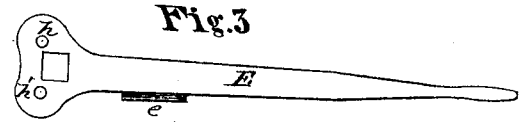
Witnesses.
Cha* Kenyon
Villette Anderson
Inventor.
H. Walmer.
Chipman, Hosmer & Co
Att'ys

United States Patent Office.

HENRY WALMER, OF LEBANON, PENNSYLVANIA.

Letters Patent No. 114,995, dated May 16, 1871.

IMPROVEMENT IN WAGON-BRAKES.

The Schedule referred to in these Letters Patent and making part of the same.

*To all whom it may concern:*

Be it known that I, HENRY WALMER, of Lebanon, in the county of Lebanon and State of Pennsylvania, have invented a new and valuable Improvement in Wagon-Brakes; and I do hereby declare that the following is a full, clear, and exact description of the construction and operation of the same, reference being had to the annexed drawing making a part of this specification and to the letters and figures of reference marked thereon.

Figure 1 of the drawing is a plan view of my brake in position.

Figure 2 is a longitudinal section.

Figure 3 is a view of the lever detached.

My invention consists in an improved construction of a wagon-brake, which will be more fully described in the annexed specification.

In the drawing—

A A' represent the wheels of a wagon upon the axle B, with an appropriate frame for the attachment of the brake.

A strong cross-bar, C, is secured to the axle by the two eye-bolts $a\ a'$.

To the front side of this bar is pivoted a link, $b$, to which is attached the sliding bar $c$.

On the outer end of the cross-bar D the brake-blocks are fastened in the usual manner.

The inner end of the sliding bar $c$ passes through a hole in the axle B.

The lever E is placed upon the square end of the cross-bar C, and by it the brake is operated, being held in position in any of the well-known methods, (a chain or notched segment.) Into the notches of the segment the projection $e$ upon the lever fits and is held.

The brake-bar has two hooks or staples, $f$, on its lower side, which pass around the shafts $g$, thus preventing the brake from being thrown upward.

If it is preferred or more suitable to the wagon, the lever may be operated in a horizontal position back of the axle, viz.:

The lever E is held with one of its holes, $h$, to the eye-bolt F, and the other hole is secured or bolted to the sliding bar $c$ by one of its holes, $d$, and the other hole, $h'$, of the lever.

A semicircular piece, G, is bolted to the back side of the axle, as shown in fig. 1, and is notched with saw or ratchet-teeth $i$, for the purpose of holding the lever E in position, by the projection $e$.

This arrangement of brake is both simple and strong, not liable to get out of order, and can be readily attached to any kind of wagon to suit different positions, being easily changed from the vertical to the horizontal position, which is very often very desirable.

Having thus described my invention,

What I claim as new, and desire to secure by Letters Patent, is—

1. The combination of the brake-bar C, link $b$, and the sliding bar $c$ with the lever E, when arranged substantially as shown and for the purpose specified.

2. The combination of the axle B with the eye-bolt F, sliding bar $c$, semicircular piece G provided with saw-teeth, and the lever E, when all constructed substantially as shown, and for the purpose set forth.

In testimony that I claim the above I have hereunto subscribed my name in the presence of two witnesses.

HENRY WALMER.

Witnesses:
ELIAS S. SNOKE,
BASSLER BOYER.